United States Patent [19]

Hart

[11] 4,046,939

[45] Sept. 6, 1977

[54] GAS RESISTANT FOAM MATERIALS

[75] Inventor: John A. H. Hart, South March, Canada

[73] Assignee: Her Majesty the Queen in Right of Canada, Canada

[21] Appl. No.: 647,097

[22] Filed: Jan. 7, 1976

Related U.S. Application Data

[63] Continuation of Ser. No. 132,611, April 8, 1971, abandoned.

[30] Foreign Application Priority Data

May 4, 1970   Canada ................................... 81768

[51] Int. Cl.$^2$ .............................................. B32B 5/18
[52] U.S. Cl. ........................................ 428/311; 2/2; 55/DIG. 16; 55/387; 55/524; 210/525; 427/244; 427/385 B; 428/323; 428/408; 428/425
[58] Field of Search ......... 55/316, 524, 387, DIG. 16; 427/244, 385 B; 428/253, 310, 311, 323, 408, 425; 162/188; 210/525; 2/2

[56] References Cited

U.S. PATENT DOCUMENTS

| | | | |
|---|---|---|---|
| 3,238,056 | 3/1966 | Pall et al. | 428/338 |
| 3,463,690 | 8/1969 | Converse et al. | 156/324 |
| 3,586,596 | 6/1971 | Ainsworth et al. | 2/2 |
| 3,632,533 | 1/1972 | Winkler | 260/2.5 BE |
| 3,647,607 | 3/1972 | Hillers | 156/220 |
| 3,748,217 | 7/1973 | May et al. | 156/78 |

FOREIGN PATENT DOCUMENTS

575,379   2/1946   United Kingdom

OTHER PUBLICATIONS

H. Bennett, The Chemical Formulary, vol. IV, p. 4, Chemical Publishing Co., Inc., 1939.

B. E. Lauer and R. F. Heckman, Chemical Engineering Techniques, pp. 383-384, Reinhold Publishing Corp., 1952.

A. M. Schwartz and J. M. Perry, Surface Active Agents, Their Chemistry and Technology, pp. 15-17, Interscience Publ. Inc., 1949.

J. W. Hassler, Activated Carbon, p. 130, Chemical Publishing Co. Inc., 1963.

*Primary Examiner*—James J. Bell
*Attorney, Agent, or Firm*—Stevens, Davis, Miller & Mosher

[57] ABSTRACT

An air and water vapor permeable open cell solid resin foam resistant to passage therethrough of noxious chemicals in liquid or vapor form said foam having dispersed therein a particulate adsorbent material for said noxious chemicals said particulate adsorbent material being bonded in said foam by an organic binder which is substantially free from substances which substantially deactivate the adsorbent.

9 Claims, No Drawings

GAS RESISTANT FOAM MATERIALS

This application is a continuation of application Ser. No. 132,611, filed Apr. 8, 1971, now abandoned.

This invention relates to cellular resin foams which are resistant to the passage of noxious undesirable chemicals such as liquids and condensable vapors and gases but which are relatively permeable to air and water vapor. More particularly the present invention relates to rigid and flexible resin foams having dispersed therein particulate adsorbent material which is capable of adsorbing said noxious chemicals which adsorbent material is bonded in said foam by an organic binder which is desirably essentially free of substances which substantially de-activate said adsorbent.

For protection against chemical warfare agents fabrics have been used which are impervious to gases, but, although useful in certain limited circumstances, such garments are too uncomfortable to be worn for extended periods of time or for general use. Attempts have, therefore, been made to provide garments made from fabric which is sufficiently permeable to air and water vapor to permit their use by humans with some degree of comfort for a reasonable period and at the same time provide protection from the undesirable effects of noxious chemicals such as chemical warfare agents. Such attempts are described for example in British Pat. No. 575,379 issued Feb. 15, 1946 to Kingan, and U.S. Pat. No. 2,984,584 issued May 16, 1961 to Glarum. In these patents woven and non-woven fabrics are impregnated with an adsorbent such as finely divided carbon which is held in place on the textile fibres by a polymeric binder. While these impregnated fabrics are marked improvements over the aforesaid known impervious fabrics, they still suffer the marked disadvantage that, in order to provide sufficient protection to the wearer against the effects of noxious chemicals, the fabric has to be impregnated with so much carbon that a relatively large amount of the inherent flexibility and air permeability of the fabric is lost.

It has now been found that much improved resistance to passage of noxious chemicals in both liquid and vapor form is provided for a given weight of adsorbent per unit area of material, with high air and water vapor permeability when the adsorbent is dispersed into an open-celled cellular resin foam such as a polyurethane foam. It is believed that the improved resistance is due to the relatively large surface area of the adsorbent presented to the noxious chemicals in liquid or vapor form and to the tortuous path which they must take in passing through the foam.

According to the present invention therefore there is provided an air and water vapor permeable open cell solid resin foam resistant to passage therethrough of noxious chemicals in liquid or vapor form said foam having dispersed therein a particulate adsorbent material for said noxious chemicals said particulate adsorbent material being bonded in said foam by an organic binder which is substantially free from substances which substantially de-activate the adsorbent. The present invention also provides a process for the production of such a foam which comprises impregnating said foam with a suspension or dispersion of said particulate adsorbent material containing said binder, removing excess liquid from said foam and drying said foam to cure said binder.

The adsorbent material in particulate form may be any solid particulate material capable of adsorbing the noxious chemicals such adsorbent materials being well known per se in the art and including for example silica gel and active clays of the attapulgite and bentonite classes, e.g. fuller's earth. A particularly preferred adsorbent material is activated carbon and as such the following description will refer mainly to active carbon. However it will be clear to a person skilled in the art that any other particulate adsorbent material may be used.

In addition to the particulate adsorbent the foam may also be impregnated with chemically active materials to inactivate any chemical substance which may desorb from the adsorbent material. Thus for example octachlorodiphenyl urea may be present in addition to active carbon to improve the resistance of the foam to the passage of mustard gas (dichlorodiethyl sulphide).

The present invention has particular application to flexible foam materials which have particular utility in the garment industry and it has been found in addition to maintaining a high permeability to water vapor and air such flexible foams also retain high flexibility.

It will be appreciated that flexible foams do not per se possess high mechanical strength so that, for use in garments, it is preferred to bond e.g. laminate, the foam, in known manner, either before or after the impregnation treatment, to a fabric, such as a loose knit or woven textile material, e.g. nylon tricot or cotton sheeting, in order to provide a reinforced material. Instead of the loose knit or woven fabrics, non woven fabrics such as netting or scrim may also be used to reinforce the foam. If the reinforcing fabric is also impregnated some additional resistance may be obtained in view of the additional adsorbent employed this effect is usually minimal. The fabric is essentially for mechanical reinforcement and is bonded to the foam for example by known lamination techniques such as flame lamination, adhesive lamination, stitch bonding and quilting.

In a preferred embodiment of the present invention therefore the activated carbon impregnated flexible polyurethane foam is laminated to a reinforcing fabric, such as a knitted or woven textile, so that the foam may be fabricated into drapes and garments or coverings for decontamination workers and others exposed to noxious chemicals in liquid and vapor form such as chemical warfare agents, industrial poisons, and insecticides. Preferably the reinforcing textile is a knitted textile so that the flexibility and draping qualities of the foam are not materially reduced. The reinforcing fabric should be freely permeable to air so that the permeability of the laminated combination is not substantially less than the permeability of the cellular material. The reinforcing material is preferably impregnated with activated carbon provided that it retains its essential permeability.

Laminates of fabrics with foam materials for garment manufacture are well known in the art, but it is most surprising that impregnation of the foam material results in a fabric having an air and water vapor permeability which approaches that of the unimpregnated material. In certain cases, impregnation actually increases the air permeability for reasons which will be discussed more fully hereinafter.

Although the preferred material for the manufacture of garments is a fabric reinforced flexible polyurethane foam, having an open cell structure, it will be understood that the present invention includes rigid foams, having an open cell structure which may also be impregnated with the particulate adsorbent for use in special applications such as linings for rooms in which the air must be free from undesirable, noxious chemicals and as filters in air or gas duct work.

While polyurethurane foams such as those of the polyester type are the preferred foams, other rigid and flexible foams may be impregnated with advantage, including cellulose, polystyrene, vinyl polymers and polyesters. Foamed synthetic and natural rubbers are not particularly suitable as they may contain substances such as impurities, low molecular weight polymer, or processing additives in amounts large enough to saturate a significant part of the adsorption capacity of the adsorbent and therefore become less effective in adsorbing noxious chemicals although they can be treated according to the present invention with advantage. The thickness of the foam material can vary widely from about 1/16 inch or less up to several inches, depending upon the final use. Similarly density and cell size can vary over a wide range depending upon the porosity desired.

The activated carbon which is preferably used may be produced by heat treatment of vegetable matter, animal matter, coal, lignite, petroleum residues or synthetic organic polymers either with or without the addition of chemicals, and characterized by rapid and effective adsorption. Preferably the carbon should be finely divided to ensure even impregnation and maximum surface area. Preferably the active carbon has an average particle size of about 7–10 microns. Finer grinding is of little advantage and it has been found that with coarse powder (circa 25 microns) the suspension settles too rapidly and an excessive amount of binder is required to prevent rubbing off. In order to provide clothing for adequate protection of the body against chemical warfare agents at least 5 milligrams of active carbon per square centimeter of foam are usually required. Up to about 12 milligrams of active carbon per square centimeter of foam can be present, without marked loss of porosity or flexibility to flexible foams. In less critical applications the presence of amounts less than 5 milligrams per square centimeter of foam may be quite satisfactory. The amount of active carbon present in the foam can be varied by adjusting the concentration of the carbon in the impregnating suspension or by repeating the impregnation of the foam two or even more times.

The active carbon is impregnated into the foam material by conventional impregnating techniques, such as immersion of the foam in a suspension of the active carbon in water or an organic solvent, such as ethyl alcohol. The choice of solvent is determined by the solubility characteristics of the foam. For example foamed polystyrene is soluble in benzene and as such benzene is unsuitable. Impregnation is followed by squeezing or pressing to remove excess liquid and drying to cure the binder incorporated with the active carbon in the suspension. When rigid foams are impregnated vacuum techniques to remove excess liquid may be employed.

The suspension may contain, in addition to the water or organic solvent and active carbon powder, a dispersing agent such as ammonium caseinate or the sodium salt of a styrene-maleic anhydride copolymer together with the organic binder necessary to hold the carbon in the cellular structure of the foam.

The organic binder may be of any type known to the carbon impregnating art (pigment binding art; powder binding art) and which desirably does not contain substantial amounts of substances such as impurities, low molecular weight polymer processing additives and plasticizers which are adsorbed by activated carbon in amount sufficient to effect a substantial reduction of the adsorptive capacity of the activated carbon. Examples of water soluble binders include natural gums, cellulose and starch derivatives, salts of alginic acid and polymers of acrylic acid, acrylamide, vinyl alcohol and vinyl pyrrolidone. Examples of organic binders which are soluble in organic solvents but not soluble in water include cellulose esters, cellulose ethers, polymers and co-polymers of vinyl esters such as vinyl acetate, styrene, acrylic esters, methacrylic esters, butadiene, acrylonitrile and chloroprene; natural rubber and chlorinated rubber. Examples of water-insoluble binders used in the form of a dispersion in water often referred to as a latex include natural and synthetic rubbers, polymers and co-polymers of vinyl esters, vinyl acetals, acrylic esters, methacrylic esters, styrene, butadiene, acrylonitrile chloroprene, ethylene and propylene.

When water is used as the medium of the impregnation suspension it is usually desirable to add a dispersing agent to assist in dispersion of the activated carbon and prevent flocculation of dispersed activated carbon. When the binder is in the form of an aqueous dispersion of a water insoluble binder such as the latex form of natural rubber, polyethylacrylate or polyvinyl acetate it is desirable to add a stabilizing agent to the suspension of activated carbon in water before incorporating the binder, so as to prevent mutual flocculation of the activated carbon and the latex binder. It is believed that in the absence of such a stabilizing agent, the emulsifying and dispensing agents added during manufacture of a latex binder and which are essential for its stability are preferentially adsorbed by the activated carbon and the latex becomes so unstable as to flocculate. Substances have been found which function as dispersing agents as well as stabilizing agents, and examples of these include ammonium caseinate, the sodium salt of a copolymer of styrene and maleic anhydride; the sodium salt of the condensation product of formaldehyde and naphthalene sulphonic acid; the sodium or ammonium salt of sulphonated lignin; the sodium salt of caraboxymethyl cellulose; methylcellulose and polyvinyl pyrrolidone. Elastomeric binders such as natural rubber, synthetic rubbers and polyethylacrylate are preferred when flexibility is required, but when some rigidity is acceptable non-elastomeric binders such as polyvinyl acetate may be used. The amount of of binder can vary quite widely between about 15 and 100 parts per 100 parts by weight of carbon; 25 parts per 100 parts of carbon being particularly satisfactory. Insufficient binder causes weak binding and hence excessive "rub off". Excess binder may impede the access of the noxious gases to the carbon thus reducing adsorption efficiency in addition to unnecessarily increasing the weight of the foam and reducing drape and flexibility.

In addition to the activated carbon, dispersing agents, stabilizing agents and binder, the impregnating suspension may also include high molecular weight water-soluble polymers such as caboxymethyl cellulose to inhibit settling of the activated carbon.

A liquid repellent agent such as the fluorochemical polymer dispersion known under the trademark FC 208, a product of Minnesota Mining and Manufacturing Co. may be added to the suspension to impart water and oil repellency to the impregnated foam.

After impregnating the foam and drying, the impregnated foam may also be impregnated with a liquid repellent to impart thereto repellency to liquids. The foam may also be impregnated with an elemental carbon-free solution or dispersion of the binder to increase the resistance of the carbon dispersed in the foam to removal by mechanical action. The foam may also be impregnated with a suspension of pigment such as titanium dioxide or yellow iron oxide to cover or partly cover the black color of the carbon, to effect camouflage coloring or reduce absorption of radiant heat.

In general, it is desirable that the material such as the binder, dispersing agents, repellents, and pigments added to the impregnating suspension together with the activated carbon, or applied in a second impregnation after the impregnation with active carbon, are free from substances which are adsorbed by the activated carbon and have the effect of reducing the useful adsorptive capacity of the activated carbon. However, the addition of materials which have an adverse effect upon the useful adsorptive capacity of the carbon may be acceptable, provided that the amount of such material in relation to the amount of activated carbon is not large enough to lower the useful adsorptive capacity of the carbon below that required for the use to which the impregnated foam is to be put. Thus in some uses, a loss of more than 5 per cent of the adsorptive capacity of the carbon would not be acceptable; in other uses a loss of 20 per cent of the adsorptive capacity of the carbon would be acceptable, when the use of a particular binder or other additive would confer desirable properties such as high flexibility, liquid repellency or resistance to burning.

The present invention will be further illustrated by way of the following examples:

EXAMPLE 1

5 Parts casein and 1 part ammonia, s.g..920 were mixed with 200 parts water and stirred until all the casein was dissolved. 100 parts of activated carbon type BPL (a trademark of Pittsburgh Chemical Company) was stirred into the suspension until the carbon was completely dispersed. The carbon was wet ball milled before addition to the suspension a mass median diameter of 2.5 microns with 98% by weight smaller than 7 microns. 50 parts of an acrylic elastomer latex Hycar 2671 (a trademark of B. F. Goodrich Co.) and 94 parts of water were added and mixed to provide a suspension containing 25% by weight of carbon. This suspension was subsequently employed for impregnation as set forth in subsequent examples.

EXAMPLE 2

100 Parts of activated carbon Type BPL, as in Example 1 were stirred into a solution of 3 parts by weight of carboxymethyl cellulose (CMC-7A, a trademark of Hercules Powder Co.) in 340 parts by weight of water until the carbon was completely dispersed. To 440 parts of this mixture, 60 parts of a 5% solution of a styrene-maleic anhydride copolymer salt SMA 1440H, (a trademark of Sinclair Petrochemicals Inc.) in water and 44.5 parts of an acrylic elastomer latex Ucar 890, (Trademark of Union Carbide, Canada Ltd.) were added and mixed by stirring, to provide a stable dispersion which was suitable for use as an impregnating bath.

EXAMPLE 3

The impregnating bath of Example 1 was used to saturate a polyester type polyurethane open cell flexible foam, 5/32 inch in thickness 100-110 cells per inch, weight 1.7 oz/sq. yd., laminated by the flame bonding-process to a nylon tricot of 40 denier yarn, 36 wales and 42 courses per inch and weighing 2.0 oz/sq. yd. Excess liquid was removed by passing the laminate through the squeeze rolls of a padding mangle. The laminate was then heated to 150° C. for 10 minutes to cure the binder. The carbon add-on, and air permeability were measured and the impregnation was repeated. The results are set out in Table 1 below.

EXAMPLE 4

An unsupported flexible polyurethane foam, polyester type supplied by "Hardifoam Products Ltd.", 5/64 inch in thickness, 1.61 oz/sq. yd. was treated according to the process of Example 3. The results are set out in Table 1 below.

EXAMPLE 5

An unsupported flexible polyurethane foam, polyester type supplied by "Hardifoam Products Ltd.", ⅛inch in thickness, 2.95 oz/sq. yd. was treated according to the process of Example 3. The results are set out in Table I below.

EXAMPLE 6

A cotton sheeting 5 oz/sq. yd. was treated according to the process of Example 3 and the results are tabulated in Table I below.

TABLE I

| Material | Carbon Content | | % of Fabric Weight | Air Permeability |
|---|---|---|---|---|
| | mg/cm$^2$ | oz/sq.yd. | | c.ft/ft$^2$/min/0.5"W.G. |
| Example 3 Untreated | 0 | 0 | | 114 |
| 1st impregnation | 5.3 | 1.56 | 42 | 108 |
| 2nd impregnation | 11.2 | 3.29 | 89 | 86 |
| Example 4 Untreated | 0 | 0 | 0 | 176 |
| 1st impregnation | 2.7 | 0.79 | 49 | 135 |
| 2nd impregnation | 5.8 | 1.71 | 106 | 103 |
| Example 5 Untreated | 0 | 0 | 0 | 58 |
| 1st impregnation | 4.3 | 1.26 | 43 | 81 |
| 2nd impregnation | 9.8 | 2.88 | 98 | 105 |
| Example 6 Untreated | 0 | 0 | 0 | 75 |
| 1st impregnation | 3.9 | 1.15 | 23 | 8 |
| 2nd impregnation | 6.1 | 1.79 | 36 | less than 1 |

Table I shows that a foam can absorb a considerably greater amount of carbon than a cotton material, attention being particularly drawn to the column indicating carbon Add-On as a percentage of fabric weight. Even a single impregnation results in more carbon in the foam than is possible with a cotton sheeting. Coupled with the increased carbon pick-up is the surprising fact that air permeability is not reduced to the same extent. Attention is drawn to the last column of Table I which indicates that with a carbon pick-up of only 36% of fabric weight, cotton sheeting is almost impermeable to air. On the other hand, with a carbon pick-up in foam materials (2nd impregnation) of between 89 and 106% of fabric weight air permeability is only slightly reduced (to 95% in Example 3 and 77% in Example 4) and in the case of Example 5 the permeability actually increases. It is believed that the increase in Example 5 can be attributed to a cellular breakdown, within the foam, of partially closed cells by the impregnating process. However, whatever the mechanism may be, there remains the surprising and unexpected result that despite a very considerable carbon pick-up, the air permeability of the foam is not reduced.

EXAMPLE 7

In order to demonstrate the superior resistance of the carbon impregnated foams of the present invention to passage of chemical warfare agents while retaining the high degree of air permeability desired for the comfort of a person wearing a garment including the foam, a series of tests were conducted on various foams, cotton sheets, tricots, flannels, poplins and nylon materials as set out in Table II. Each material was impregnated according to the process of Example 3 and subjected to a mustard gas (dichlorodiethyl sulphide) penetration test both initially and after each impregnation with activated carbon. The addition of activated carbon was varied by adjusting the concentration of the impregnating bath or repeating the impregnation a second time. The mustard gas penetration time was measured by placing one milligram of mustard gas as a drop on a sheet of filter paper (Whatman No. 1.) The material being tested was placed over the mustard gas contaminated paper. Over the test material was placed a mustard gas sensitive test paper. The whole assembly was then covered by a glass plate. The test paper was prepared by saturating filter paper with an alcoholic solution of Congo Red, drying, saturating with a solution of 1, 3, 4, 6 tetrachloro, 7,8 diphenyl glycouril in tetrachloroethane and drying again. Penetration of mustard gas was shown by a blue spot appearing on the red test paper and the time for penetration was measured in minutes.

Two "factors of merit" A and B were calculated as follows: A was obtained by dividing the mustard gas resistance time by the carbon loading expressed in milligrams per sq. cm., and this represents the efficiency of the charcoal in resisting the penetration of mustard gas. It will be observed that, the effectiveness of the carbon for a given loading with carbon in the foam was higher than in textile materials. With increased loading the efficiency drops since the carbon in the thicker layer is not so readily accessible for adsorption of vapors as the carbon in the thinner layers. Thus, it is concluded that the cellular structures afford greater resistance to mustard gas than textile materials, not only in terms of absolute minutes of protection but also in terms of the efficiency of the carbon on a weight basis. These considerations do not consider the added advantage of improved air permeability which becomes apparent in factor B. Factor B was calculated by multiplying factor A by the air permeability of the impregnated fabric, and clearly illustrates the marked superiority of the foam, in terms of protective capability and porosity, as compared to any of the textiles.

EXAMPLE 8

In order to demonstrate that a foam has a greater pick-up of charcoal compared with a textile, a polyurethane foam/nylon tricot laminate was impregnated according to the process of Example 3 and the foam was then separated from the textile backing. The weight of charcoal in each material was determined.

TABLE III

| Material | Basic weight oz/sq.yd. | | |
|---|---|---|---|
| | Untreated | Impregnated | Carbon loading |
| Laminate | 3.81 | 6.76 | 2.95 |
| Polyurethane Foam | 1.81 | 3.62 | 1.82 |
| Nylon Tricot | 1.97 | 2.81 | 0.85 |

It will be observed that, although the basic weights of the foam and tricot backing were approximately equal, the charcoal taken up by the foam was more than twice that taken up by the tricot.

EXAMPLE 9

30 Parts of titanium dioxide were stirred in a solution of 0.15 parts of tetrasodium pyrophosphate in 58 parts of water until the titanium dioxide was completely dis-

TABLE II

| Fabric | Basic Weight of Fabric oz/sq.yd. | Carbon Content Weight per unit area | | Percent of Fabric Weight | Air Permeability | | Mustard Gas Resistance Time (min) | Factors of Merit | |
|---|---|---|---|---|---|---|---|---|---|
| | | oz/sq.yd. | mg/sq.cm. | | Before Impregnation | After Impregnation | | A | B |
| Polyurethane foam-nylon tricot laminate | 4.3 | — | — | — | 115 | — | 2.3 | — | — |
| | | 0.44 | 1.5 | 10 | | 114 | 19 | 13 | 1370 |
| | | 0.91 | 3.1 | 21 | | 127 | 33 | 11 | 1350 |
| | | 1.6 | 5.3 | 36 | | 108 | 40 | 7.6 | 820 |
| | | 2.3 | 7.9 | 57 | | 110 | 66 | 8.3 | 910 |
| | | 3.3 | 11.2 | 77 | | 86 | 99 | 8.8 | 760 |
| Cotton sheeting plain weave | 4.8 | | | | 75 | | 0.1 | | |
| | | 0.65 | 2.2 | 14 | | 27 | 6.3 | 2.9 | 78 |
| | | 1.4 | 4.9 | 30 | | 7.9 | 16 | 3.2 | 25 |
| | | 1.7 | 5.6 | 35 | | 2.2 | 23 | 4.1 | 9 |
| | | 2.2 | 7.6 | 47 | | <1.0 | 25 | 3.2 | <3 |
| Cotton sheeting plain weave | 2.9 | 1.1 | 3.6 | 36 | 211 | 160 | 4.1 | 1.2 | 188 |
| Cotton percale | 3.6 | 0.56 | 1.9 | 16 | 56 | 1.4 | 5.9 | 3.2 | 4.3 |
| Cotton sheeting plain weave | 5.7 | 1.1 | 3.6 | 19 | 14 | 1.1 | 19 | 5.3 | 5.5 |
| Cotton tricot | 4.6 | 1.8 | 6.1 | 39 | 236 | 89 | 16 | 2.6 | 232 |
| Canton flannel | 2.5 | 1.5 | 5.2 | 61 | 324 | 144 | 11 | 2.1 | 306 |
| Canton flannel | 4.9 | 2.8 | 9.5 | 57 | | 20 | 75 | 7.9 | 158 |
| Cotton Sateen | 9.4 | 2.1 | 7.1 | 22 | 23 | <1.0 | 62 | 6.5 | <6.5 |
| Cotton Poplin | 4.3 | 0.50 | 1.7 | 12 | 24 | <1.0 | 18 | 10 | <10 |
| Nylon-cotton twist plain weave | 5.0 | 0.74 | 2.5 | 15 | 92 | 31 | 7.5 | 3.0 | 93 | persed. To this dispersion 12 parts of the acrylic elastomer latex Hycar 2671 (a trademark of B. F. Goodrich Co.) was added and mixed by stirring to make a bath composition suitable for impregnation or coating.

EXAMPLE 10

The carbon impregnated foam laminate prepared by the method of Example 3 was saturated with the bath composition of Example 9. Excess liquid was removed by passing the impregnated laminate through the squeeze rolls of a padding mangle. The laminate was air-dried and then heated to 150° C for 10 minutes to complete cure of the acrylic elastomer binder. The resulting material was grey in color while the material of Example 3 was black in color. Viewed on the fabric side of the laminate and compared with photographic step wedge (Kodak Gray Scale Series V, Eastman Kodak Co.) the material had a reflection density of 0.7 while the untreated material of Example 3 had a reflection density of 1.9.

EXAMPLE 11

The bath composition of Example 9 was applied to the fabric side of the carbon impregnated foam laminate of Example 3 by means of a soft brush and dried. The surface of the fabric side was made uniformly grey in color, but the coating did not penetrate appreciably into the foam material and was not visible on the foam side. When compared with a photographic step wedge as described in Example 10 the reflection density of the fabric side was 0.3 and the reflection density of the foam side was 1.9 or greater.

EXAMPLE 12

The carbon impregnated foam laminate material of Example 3 was saturated with a mixture of 20 parts of Scotchgard FC208 (a trademark for a non-ionic fluorochemical resin emulsion with a nominal solids content of 30% supplied by Minnesota Mining and Manufacturing Co.) and 80 parts of water. Excess liquid was removed by passing the impregnated laminate through the rolls of a padding mangle. The material was then dried for 30 minutes at 105° C. When tested by the Hydrocarbon Resistance Test 118-1966 of the American Association of Textile Chemists and Colorists the oil repellency rating of the treated material was found to be 6, indicating a high degree of repellency.

The impregnated foam of the present invention forms the chemical vapor barrier of a protective garment. An outer layer of fabric acts as a shield against gross contamination of the chemical vapor barrier by liquids and protects it against mechanical damage during wear.

A suitable chemical vapor barrier is one consisting of the impregnated foam laminate of Example 3. A suitable outer layer is a plain weave fabric of twisted yarn of 50% continuous filament nylon and 50% cotton in both warp and weft, with warp of 60 yarns per inch and weft of 50 yarns per inch, a basic weight of 5.0 oz./sq. yard, and air permeability of 70 c.ft/ft²/min/½inch WG. The outer layer may be treated with any dye or antistatic, crease resistant, permanent press and oil or water repellent finishes. Preferably it is treated with a fluorochemical oil and water repellent finish such as Scotchgard (a trademark of Minnesota Mining and Mfg. Co.) or Zepel (a trademark of Dupont de Nemours & Co.)so that noxious chemical liquids which come into contact with the garment do not wet the outer layer. The outer layer thus prevents penetration of liquid so that the inner active carbon bearing layer is required only to act as a barrier to vapour which diffuses inward from drops resting on the outer layer. Although it is desirable to protect the inner layer from gross contamination with liquids, the foam material of Example 3 is capable of acting as a barrier to substantial quantities of liquid as well as their vapors.

A garment made with the foam laminate material of Example 3 is preferably constructed with the nylon tricot face inward and the foam face outward and against the outer shield fabric.

The outer shield fabric may be of any fabric, woven, knitted or non-woven with satisfactory durability, weight, handle, texture and color to suit the use to which the garment will be put. However, too open a construction will give poor protection against liquid penetrating while too close a construction will prevent the proper ventilation of the body which is necessary for working under warm conditions and which allows cooling of the body by evaporation of sweat.

The embodiments of the invention in which an exclusive property or privilege is claimed are defined as follows:

1. An air and water permeable open cell solid flexible polyurethane foam resistant to the passage therethrough of noxious chemicals in liquid or vapor form, said foam having dispersed therein particulate activated carbon of average particle size in the range 7 to 10 microns and in an amount of at least 10% by weight of said foam and not in excess of 12 milligrams per sq. cm. of foam, said activated carbon particles being bonded in said foam by an acrylic elastomeric binder which is substantially free from substances which would substantially deactivate the activated carbon particles, said binder being present in an amount from 15 to 100 parts by weight per 100 parts by weight of said carbon.

2. A foam as claimed in claim 1, which is an elastically resilient foam.

3. A foam as claimed in claim 1, which is a polyurethane foam of the polyester type.

4. A foam as claimed in claim 1, which is a foam of a styrene vinyl or cellulose resin.

5. A foam as claimed in claim 1 in which the activated carbon comprises at least 5 milligrams/sq.cm.

6. A foam as claimed in claim 1, in which the binder is a water insoluble resin.

7. A foam as claimed in claim 1, in which the binder is a self curing acrylic polymer.

8. A process for the production of a foam as claimed in claim 1 which comprises impregnating said foam with a suspension or dispersion of said carbon particles containing said binder; removing excess liquid from said foam and drying said foam to cure said binder.

9. A method of removing noxious gases from the atmosphere which comprises causing the atmosphere to pass through the foam of claim 1.

* * * * *